(12) United States Patent
Henderson et al.

(10) Patent No.: US 8,171,802 B2
(45) Date of Patent: May 8, 2012

(54) METHOD FOR MEASURING THE VOLUME FLOW OF ELECTRICALLY CONDUCTIVE LIQUIDS THROUGH A VESSEL

(75) Inventors: Colin Henderson, Bury (GB); Uwe Lang, Taunusstein (DE); Stefan Hother, Wiesbaden (DE); Steven Bookbinder, Manchester (GB); Thomas Köhler, Dreieich (DE)

(73) Assignee: Brita GmbH, Taunusstein (DE)

( * ) Notice: Subject to any disclaimer, the term of this patent is extended or adjusted under 35 U.S.C. 154(b) by 53 days.

(21) Appl. No.: 12/736,263

(22) PCT Filed: Mar. 27, 2009

(86) PCT No.: PCT/EP2009/053644
§ 371 (c)(1),
(2), (4) Date: Sep. 24, 2010

(87) PCT Pub. No.: WO2009/118402
PCT Pub. Date: Oct. 1, 2009

(65) Prior Publication Data
US 2011/0011184 A1    Jan. 20, 2011

(30) Foreign Application Priority Data

Mar. 28, 2008  (EP) ..................................... 08153500
Dec. 10, 2008  (DE) ......................... 10 2008 054 479

(51) Int. Cl.
*G01F 1/58* (2006.01)
(52) U.S. Cl. .................................................. 73/861.12
(58) Field of Classification Search ............... 73/861.15, 73/861.13, 861.12, 152.29, 54.07
See application file for complete search history.

(56) References Cited

U.S. PATENT DOCUMENTS

| 4,169,377 A | 10/1979 | Scheib |
| 4,426,878 A * | 1/1984 | Price et al. ................... 73/54.07 |
| 4,724,705 A | 2/1988 | Harris |
| 5,497,664 A | 3/1996 | Jorritsma |

(Continued)

FOREIGN PATENT DOCUMENTS

DE    1 133 140    7/1962

(Continued)

*Primary Examiner* — Jewel V Thompson
(74) *Attorney, Agent, or Firm* — Hudak, Shunk & Farine Co. LPA (57) ABSTRACT

It is described a method of measurement of the volume $V_D$ of the flow-rate of electrically conductive liquids the conductivity of which is at least codetermined by at least one parameter p, wherein the liquid flows through a vessel having a predetermined shape, and wherein the respective filling volume $V_o$ is determined by at least one measured value x, which is measured by an electrical conductivity measuring device comprising electrodes, wherein the vessel is filled in succession and then is emptied through its outlet, through which the filling heights h are constantly changing. At least one reference table comprising calibration measured values $x_R$ and filling volumes $V_o$ belonging to them is constructed by means of calibration measurements using several liquid samples, which have different p-values and different filling heights h in the vessel. The measured values x are measured in time intervals and the respective filling volumes $V_o$ are determined by comparison of the respective measured values x with values $x_R$ of the table, and the volume $V_D$ of the rate of flow is determined from the filling volumes $V_o$ over a time period. The measuring device for the determination of the volume $V_D$ of flow rate of electrically conductive liquids through a vessel comprises at least two measuring electrodes.

47 Claims, 6 Drawing Sheets

U.S. PATENT DOCUMENTS

| | | | |
|---|---|---|---|
| 5,691,484 A * | 11/1997 | Feller | 73/861.13 |
| 5,831,174 A | 11/1998 | Beaudoin | |
| 6,250,152 B1 | 6/2001 | Klein et al. | |
| 7,107,838 B2 | 9/2006 | Chai et al. | |
| 7,509,852 B2 * | 3/2009 | Maute | 73/152.29 |
| 7,905,144 B2 | 3/2011 | Thobe | |
| 2005/0229700 A1 | 10/2005 | Chai et al. | |
| 2005/0257616 A1 * | 11/2005 | Kozlov et al. | 73/514.16 |
| 2010/0018305 A1 * | 1/2010 | Maute et al. | 73/152.29 |

FOREIGN PATENT DOCUMENTS

| | | |
|---|---|---|
| DE | 1 798 256 | 1/1972 |
| DE | 27 49 547 B1 | 3/1979 |
| DE | 30 18 718 A1 | 12/1981 |
| DE | 35 28 624 A1 | 2/1986 |
| DE | 87 01 392 U1 | 3/1987 |
| DE | 40 42 257 A1 | 7/1992 |
| DE | 197 26 044 A1 | 2/1999 |
| DE | 295 22 232 U1 | 2/2001 |
| DE | 10 2005 035 045 A1 | 2/2007 |
| EP | 0 152 644 A2 | 8/1985 |
| EP | 1 125 748 A1 | 8/2001 |
| EP | 1 484 097 A1 | 12/2004 |
| EP | 1 589 325 A2 | 10/2005 |
| FR | 1 436 080 | 3/1966 |
| GB | 1 288 177 | 9/1972 |
| JP | 57 104354 | 6/1982 |
| JP | 08 050047 A | 2/1996 |
| JP | 2003 130713 A | 5/2003 |
| JP | 2004 077439 A | 3/2004 |
| WO | 01 74719 A1 | 10/2001 |
| WO | WO 02/27280 A2 | 4/2002 |
| WO | 2010 066798 A1 | 6/2010 |

* cited by examiner

Table 1

| $X_{1R}$ [µS / cm] | hardness H |
|---|---|
| . | . |
| . | . |
| . | . |
| 20 | 3 |
| . | . |
| . | . |
| . | . |

Fig. 7

Table 1a

| parameter p = hardness \ $I_1$ | 1 | 2 | 3 | 4 |
|---|---|---|---|---|
| 10 . | | | ...........2500............. | |
| 15 . | 2000......... | 2200........... | 2500 = $I_2$........ | 2600................ |
| 20 . | | ..............2500 | ...........2600 | |

Fig. 8

Table 2

| hardness H / $I_1$ | 1 | 2 | 3 | 4 |
|---|---|---|---|---|
| ⋮ | | | | |
| 15 | ⋯⋯⋯⋯⋯50 = h [mm]⋯⋯⋯⋯⋯ | | | |
| ⋮ | | | | |

Fig. 9

Table 3

| h [mm] | Δ V [l] | V₀ [l] |
|---|---|---|
| 0 | 0 | 0 |
| 10 | 0,2 | 0,2 |
| 20 | 0,21 | 0,41 |
| 30 | 0,23 | 0,64 |
| 40 | 0,26 | 0,9 |
| 50 | 0,3 | 1,2 |

Table 4

| Hardness | $V_{max}$ [l] |
|---|---|
| 1 | 100 |
| 2 | 110 |
| 3 | 120 |
| 4 | ⋮ |
| 5 | ⋮ |

Fig. 11

METHOD FOR MEASURING THE VOLUME FLOW OF ELECTRICALLY CONDUCTIVE LIQUIDS THROUGH A VESSEL

FIELD OF THE INVENTION

The invention refers to a method of measurement of the volume of rate of flow of electrical conductive liquids through a vessel having a predetermined shape, and wherein the respective filling volume $V_0$ in the vessel is determined by at least one measured value x, which is measured by an electrical conductivity measuring device comprising at least two measuring electrodes, wherein the vessel is filled in succession and then is emptied through its outlet, through which filling heights h are constantly changing, comprising the steps of measuring the measured values x in time intervals and determining the respective filling volumes $V_0$ by comparison of the respective measured values x with calibration measured values $x_R$ of at least one reference table comprising at least calibration measured values $x_R$ and filling volumes $V_0$ belonging to them, and determining the volume $V_D$ of the rate of flow from the filling volumes $V_0$ over a time period, wherein the at least one reference table is constructed by means of calibration measurements using several liquid samples, which have different p-values and different filling heights h in the vessel. The invention also refers to a respective measuring device.

BACKGROUND OF THE INVENTION

The measurements of filling heights are conducted wherever the volumes of liquids and the alteration of volume have to be determined. The measurements of filling heights are usually done by electrodes, which immerse at least partially into the liquid. The electrical conductivity or the resistance of the liquid, which is proportional to the filling height or the volume of the liquid, is measured by a suitable measuring device.

Such measurements are necessary in order to determine the exhaustion of filter cartridges, which are used in gravitation driven filtration devices.

WO 02/27280 A discloses a device using three electrodes one of which is used as reference electrode. The electrodes for level measurement are configured in such a way that a measurement value sharply changes when certain limits of the level are exceeded or fallen short of. These leaps of the measurement values can be reliably recognized without high demands on the accuracy of measurement.

A similar device is known from EP 1 484 097 B1 which comprises at least three electrodes, counting means and timers. The signals measured by these components are fed to an input of a microprocessor that, on the basis of a resident programme, elaborates important data on the life-span of the cartridge according to the amount of time passed since its first activation and the amount of water treated identified in terms of closure considered important by circuit between the electrodes, and by the ionic concentration of the pollutants, identified in terms of conductivity of the water being treated.

In case of consideration a partial filling of the vessel numerous electrodes are located on growing levels in a compensation chamber within the vessel.

This device is expensive and never even takes into consideration the design and shape of the vessel. Exact measurements of volume require intermediate measurements of the filling height taking into account the vessel shape. Usually, the vessel has any design so that the correlation between filling height and liquid volume doesn't follow a simple mathematical formula.

Most of the measuring devices ignore vessel shape so that the determination of life-span of the filter cartridge is not as precise as it should be.

U.S. Pat. No. 4,724,705 A relates to a fuel measurement device and particularly a device for determining for quantity of a fuel in a fuel tank. The fuel level indicator includes a hollow housing, a coded wafer, a short circuit wafer including a wafer substrate, a buoyant member and a continuity bridge. The coded wafer is made of a dielectric, ceramic material and extends along the interior length of the hollow housing. An electrically conductive wire strand having a known resistance per unit length is wound about the coded wafer to define a "pattern of resistance" representative of the contour of the interior wall of the fuel tank. The manufacturing of the fuel level indicator is quite an effort, in particular for manufacturing of the coded wafer.

DE 10 2005 035 045 A1 discloses a measuring device comprising a measuring element that includes at least one electrode the area of which increases in an exponential manner from one and to the other. The benefit of this invention is the fact that the value of electrical conductivity and the absolute value of the liquid level in the vessel need not to be known, if there is an exponential correlation between the measuring values and the volume of the liquid in the vessel.

SUMMARY OF THE INVENTION

The objective of the invention is to provide a method and a measuring device which allows to measure the volume of rate of flow through a vessel in a more precise and easy manner.

This objective is solved by a method, which is characterized in that the measured values x are measured in time intervals and that the respective filling volumes $V_0$ are determined by comparison of the respective measured values x with calibration measured values $x_R$ of at least one reference table comprising at least calibration measured values $x_R$ and filling volumes $V_0$ belonging to them, and that the volume $V_D$ of the rate of flow is determined from the filling volumes $V_0$, over a time period, wherein the at least one reference table is constructed by means of calibration measurements using several liquid samples, which have different p-values and different filling heights h in the vessel.

The time period, in which the filling volumes $V_0$ are measured, can be a predetermined time period. In case that the method of measurement is applied f. e. to a filtration device, the starting time can be the time when f. e. a new filter cartridge is put into the device. In this case the time period is limited f. e. by the life time of the cartridge or the time period until the cartridge is replaced.

The benefit of the invention is that simple electrodes can be used and that the parameter p and the shape of the vessel, which both influence the results of the measurements of the filling height h and therefore of the filling volume $V_0$, can be taken into consideration by constructing at feast one reference table.

The calibration measured values $x_R$ contained in this reference table are constructed for each shape of the vessel and are deposited in the memory of the electrical conductivity measuring device. The mechanical features of the measuring device, in particular the shape and technical details of the electrodes, need not to be adapted to the shape of the vessel when one type of measuring device is used in different vessels. It is only necessary to provide the respective table or tables containing the specific values which reflect the shape and the different types of liquid flowing through the vessel. If the vessels are mass-products only, the construction of at least of one table for each type of vessel is necessary and one and the same measuring device can be used without mechanical adaption.

The values of the liquid volume in the vessel can be measured in a very precise manner, because not only parameter p but also the shape of the vessel are taken into consideration when the calibration measurements are conducted.

The at least one reference table can be deposited in a memory of the measuring device.

One reference table can be sufficient, if for example the influence of parameter p on the measurement of the filling height h is less or not significant and/or there is for example a linear relationship between $V_0$ and the shape of the vessel. In these cases the correlation between x and h and therefore between x and $V_0$ can be unique.

However, in cases, where the influence of parameter p or where more than one parameter p is getting significant on the result, more than one reference table is needed. The same is true when there is a non-linear correlation between x and $V_0$. All these facts result in ambiguous values, if only one table is used. This problem can be overcome by construction of more than one table, for example two or three reference tables in order to get unique and precise results.

It is preferred that a first reference measured value $x_1$ is measured at least once during said time period.

This first reference measured value $x_1$ is used to determine at least one of the parameters p of the liquid, which f. e. can be the hardness of water. It is further preferred that the first reference measured value $x_1$ is measured only once at the beginning of a filling procedure starting from an empty vessel. Before the beginning of filling the measuring device is in the status "waiting for water" so that at the first contact of the electrodes with the liquid results in the measurement of the first reference measured value $x_1$. After this measurement the measuring device switches into the status "height measurement" so that all following measured values are classified as measured values x.

The first reference measured value $x_1$ is stored and can be used for the calibration of the measured values x until the vessel is empty again and the next filling of the vessel has been started. According to this embodiment it is preferred that said first reference measured value $x_1$ is measured by the same two measuring electrodes which are used for the measuring of measured values x.

According to another embodiment it is preferred that this first reference measured value $x_1$ is measured every time when the measured value x is measured. In this case the measuring device does not distinguish between the very first measurement at the beginning of the filling procedure and the following measurements. This kind of measurement is more precise however it needs a reference electrode. The first reference measured value $x_1$ is measured by this reference electrode and one of the measuring electrodes which are used for the measurements of measured values x.

As illustrated in connection with the measuring device, this electrode is shielded with the exception of the lower surface.

It is preferred that a first reference table is constructed which contains the calibration first reference measured values $x_{1R}$, which are corresponding to the first reference measured value $x_1$, and the respective values of parameter p belonging to them, it is also preferred to construct a second reference table which at least contains the calibration measured values $x_R$, the values of parameter p and the respective filling heights h belonging to them and to construct a third reference table which takes into consideration the shape of the vessel and which contains the filling heights h and the respective filling volumes $V_0$ belonging to them.

It is preferred to determine the value of parameter p at least from the first reference measured value $x_1$ by comparison with the first reference table.

It is also preferred to determine the filling height h at least from the measured value x and the values of the parameter p by comparison with the values of the second reference table.

The respective filling volume $V_0$ can be determined from the filling height h by comparison with the values of the third reference table.

Starting with the measurement of the measured values x it is a step by step procedure to achieve the filling volume $V_D$.

It is preferred to use a first calibrated value which is a function of x and $x_1$ instead of x only. Therefore, in the reference Tables 1 and 2 $x_R$ is replaced by the corresponding first calibrated value $I_1$. Preferably, the first calibrated value $I_1$ is $I_1=x_1/x$.

It is preferred that a second reference measured value $x_2$ is measured at least once during said time period.

This second reference measured value $x_2$ can be measured at the beginning of the filling procedure started from an empty vessel or it can be measured every time when the measured value x is measured.

This second reference measured value $x_2$ is preferably measured by means of a reference circuit of the electrical conductivity measuring device.

In order to consider temperature drifts of the electronic part of the measuring device it is preferred to refer and therefore to calibrate the value $x_1$ to the second reference measured value $x_2$. Preferably, such a second calibrated value $I_2$ is $I_2=x_2/x_1$.

This step contributes to the improvement of the precision of the volume measurement.

Therefore it is preferred to introduce $I_2$ into the first reference table, which contains $I_1$, $I_2$ and the parameter p. From both values $I_1$ and $I_2$ the parameter p can be determined in a more precise manner.

Although $I_1=x_1/x$ and $I_2=x_2/x_1$, both values can be multiplied by a suitable factor to achieve figures which can be handled easier. It is preferred to achieve values without decimal point.

The values of the parameter p can be determined from the values and $I_2$ by comparison with values of the first reference table.

The filling height h can be determined from the values of parameter p and the first calibrated value $I_1$ by comparison with values of the second reference table.

Although the claimed method can be used to measure the volume of the flow rate of various liquids, the measurement of water is preferred. In case of water, the parameter p is the hardness H, which is the most important property of water that affects the electrical conductivity, it's possible to use another property of the liquid as parameter p, f. e. the pollution of the water.

In a preferred embodiment the measured values x, $x_1$ and/or $x_2$ are a time values.

The electrical conductivity measuring device comprises an electrical circuit which preferably comprises a capacitor means. The charging and/or the discharging time of this capacitor means can be used as measured values x, because it depends from the filling height of the liquid in the vessel.

The measured values x are measured at least once per second. It is preferred to measure the measured values x at least five times per second.

It is preferred to measure not only the measured value x but also $x_1$ and $x_2$ and to calculate $I_1$ and $I_2$. This can be done by an appropriate electronic device which is part of the electrical conductivity measuring device.

In a preferred embodiment the changes $\Delta V$ of the filling volumes $V_0$ are determined and the volume $V_D$ of the flow rate is determined from the volume changes $\Delta V$.

It is preferred to determine the volume $V_D$ of the flow rate from the respective volume increase. This embodiment is preferred if the filling of the vessel happens more rapidly than the draining off of the liquid, f. e. faster by a factor of at least 10. It is assumed that the amount of liquid which is filled in is equivalent to the amount that is drained off.

The volume $V_D$ of the flow rate is compared with a volume $V_{max}$, which is the maximum volume of the liquid, that is characterized by the at least one parameter p and which volume is allowed to flow through the filter device which is arranged downstream of the vessel. This filter device contains at least one filter medium. The exhaustion of the filter medium is indicated, when $V_{max}$ is reached.

The maximum volume $V_{max}$ depends on the at least one parameter p, for example on the hardness H in case of water. Therefore, a fourth reference table is recommended which contains the respective volume $V_{max}$ for various values of parameter p. $V_{max}$ can be determined by comparison of the values of the parameter p with the corresponding values deposited in the fourth reference table.

The exhaustion of the filter medium can be indicated acoustically and/or optically.

It is another possibility to indicate remaining volumes acoustically and/or optically until the exhaustion of the filter medium is reached.

It is preferred to use a filter cartridge as a filtering device. This filter cartridge can be arranged in the outlet of the vessel.

The objective of the invention is also solved with a measuring device for the determination of the volume $V_D$ of the flow rate of electrical conductive liquids through a vessel wherein the filling heights h are changing in the vertical direction and wherein the vessel comprises an inlet and an outlet, and a conductivity measuring device which comprises an evaluation unit and at least two measuring electrodes wherein the measuring electrodes are located in the vessel and are connected to the evaluation unit, wherein at least one measured value x is measured by the electrodes characterized in that the evaluation unit is configured for the deposition of at least one reference table comprising at least calibration measured values $x_R$ and filling volumes $V_0$ belonging to them and for comparison of the measured values x of the conductivity measuring device with the calibration measured values $x_R$ of the at least one reference table and for the determination of the volume $V_D$ of the flow rate from the filling volumes $V_0$.

Both measuring electrodes preferably extend over the total filling height of the vessel wherein these measuring electrodes are not shielded over the total filling height.

As explained in connection with the claimed method, a reference electrode is provided which is arranged near both measuring electrodes. This reference electrode is preferably shielded with the exception of its lower surface.

The electrodes can comprise a constant cross-section along the total length. The benefit of these simple electrodes is the fact that the electrodes can be cut from a long wire in order to adapt the electrodes to the height of the vessel. It is not necessary to manufacture specific electrodes for each type of vessel.

The evaluation unit preferably comprises a capacitor means. As illustrated in connection with the claimed method the charging and/or discharging time of the capacitor means is the measured value x.

The evaluation unit preferably comprises a reference circuit having a reference resistor $R_0$.

Furthermore, it is preferred that the measuring device encompasses an indicator unit which can be an optical or an acoustical unit.

In order to simplify the manufacturing of the measuring device, the electrodes can be combined to a measuring stick. It is preferred that the measuring stick is integrated into the wall of the vessel.

The vessel can be a feeding hopper of a water filtration device.

A preferred use of the measuring device is the exhaustion measuring device for filter cartridges.

The indicator unit can preferably indicate the time of change of the filter cartridge.

BRIEF DESCRIPTION OF THE DRAWINGS

Preferred embodiments are illustrated in connection with the following drawings:

FIG. 1 shows a schematic view of a measuring device,

FIG. 2 shows the measuring stick comprising three electrodes,

FIG. 3 shows a vertical cross-section of a jug containing a vessel and measuring device, FIG. 4 shows the electrical circuit of the measuring device, FIG. 5 shows a diagram how the measured value X is calculated from the charging and discharging time of the capacitor means, FIG. 6 shows a vertical cross section of a vessel

FIG. 8 Table 1a,

DETAILED DESCRIPTION OF THE INVENTION

In FIG. 1 there is shown a simplified vessel 5 which is filled with water up to the water level 40. The vessel comprises a bottom wall 6b and a sidewall 5 having an inlet 7a and an outlet 7b. Inside the vessel there is located a measuring stick 20 which is approximately 5 mm above the bottom wall 6b of vessel 5.

The measuring stick comprises two measuring electrodes 22, 24 (first embodiment) and an additional reference electrode 26 (second embodiment) which is located between the measuring electrodes 22 and 24. The three electrodes are connected via electrical connections 30, 32, 33 to an evaluation unit 12 which is connected to an indication unit 14. If the water level 40 rises up to water level 40', the volume change is measured by the measuring device.

In FIG. 2 and in the following FIGS. 3 and 4 it is illustrated the second embodiment wherein the measuring electrodes 22 and 24 are unshielded and the reference electrode 26 is shielded by a shield 27 whereas the lower surface 28 is unshielded.

In FIG. 3 a water filtration device 1 is shown which comprises a jug 2 having a grip 3 and a feeding hopper which forms the vessel 5. In the outlet of vessel 5 there is located a filter cartridge 50. The measuring device 10 is located inside vessel 5 and the electrodes are connected to the evaluation unit and to the indication unit which are arranged in the lid 4. Water to be filtered 8 is filled into vessel 5. After the filtration by the filter cartridge 50 the filtered water 9 flows into and is collected in the jug 2.

In FIG. 4 the three electrodes 22, 24 and 26 are connected to an electrical circuit which contains a reference circuit 15 in which a reference resistor 17 is arranged. Furthermore, there is a capacitor means 16 which is charged and discharged by switching the switches 18 and 19.

In FIG. 5 the diagram that corresponds to the charging and discharging of the capacitor means 16 is shown. In a first step the capacitor means is brought to a well defined voltage value by charging and discharging it. After time $T_3$ is reached, the measuring procedure is started. The capacitor means is charged until 1.5 Volts are reached and then it is discharged until the starting value of 0.75 Volts is reached. The sum of the charging time $T_4$ and the discharging time $T_5$ is used as measured value x.

EXAMPLE

The method of determination of rate of flow of water is depicted in detail in connection with FIGS. 6 to 11.

A vessel 5 (FIG. 6) having a bottom wail 6b and a side wall 6a comprises an inlet 7a and an outlet 7b, wherein the outlet is located in the bottom wall 6b. The vessel 5 is open at the upper side which forms the inlet 7a.

The shape of the vessel is defined by side wall 6a which are inclined upwards like a cone. At the left hand sight of vessel 5 there is indicated the height h in mm and the corresponding filling volume $V_0$. There is a non-finear correlation between height h and volume V because the volume increases in a non-linear manner when the water level rises.

Figure 10:
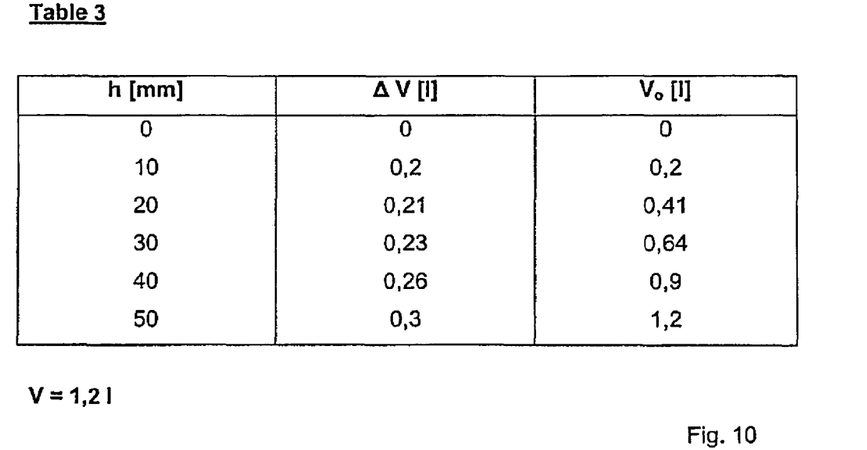
FIG. 10 Table 3.
Figure 11:
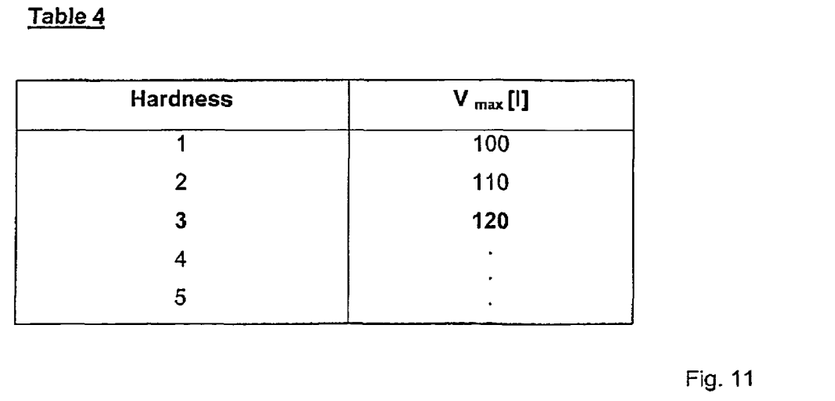
FIG. 11 Table 4.

The correlation between h and $V_0$ is deposited in Table 3 (FIG. 10).

In order to measure the hardness value H there are two options.

According to the first embodiment (only two electrodes) both measuring electrodes 22, 24 are used to measure the hardness value.

When the vessel 5 is empty and the water is filled in, the rising water level contacts the lower tips of both electrodes so that a first measurement can be done. Since the measuring device is in the status "waiting for water" the first measurement is the measurement of the first reference measured value $x_1$. After this measurement all further measurements concern the measurement of the measured values x.

Figure 7:
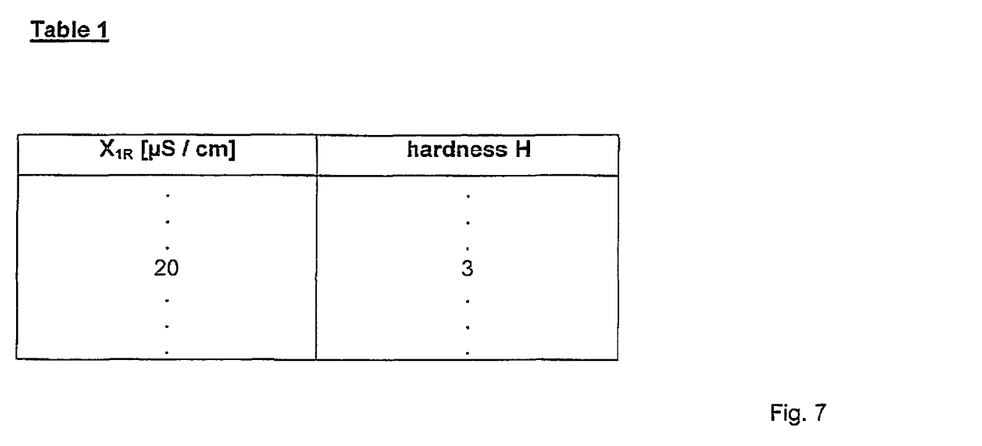
FIG. 7 Table 1.

This single first reference measured value $x_1$ is used to determine the hardness value H by comparison with the values of Table 1 (first table). If $x_1$=20 μS/cm, the hardness value H is 3. This value $x_1$ is stored in the memory of the measuring device and during the further filling process only values x are measured.

According to the second embodiment (two measuring electrodes and a reference electrode) only one measuring electrode 22 or 24 and the reference electrode 26 are used to measure the hardness value.

When the vessel 5 is empty and the water is filled in, the rising water level contacts the lower tips of both electrodes so that first measurements can be done.

One first measurement concerns the measurement of x between electrodes 22, 24 and another first measurement concerns the measurement of $x_1$ between f. e. electrode 22 and the reference electrode 26. The hardness value H is determined by comparison $x_1$ with the values of Table 1.

During the following filling process always both values x and $x_1$ are measured, whereby a change of the hardness value can be detected by a change of the values $x_1$.

However, the measured value x might be falsified by various parameters. Therefore it is recommended to normalize the measured value x by the reference measurement of the reference electrode 26. The first calibrated value $I_1=x_1/x$ is for Example 15.

Figure 8:
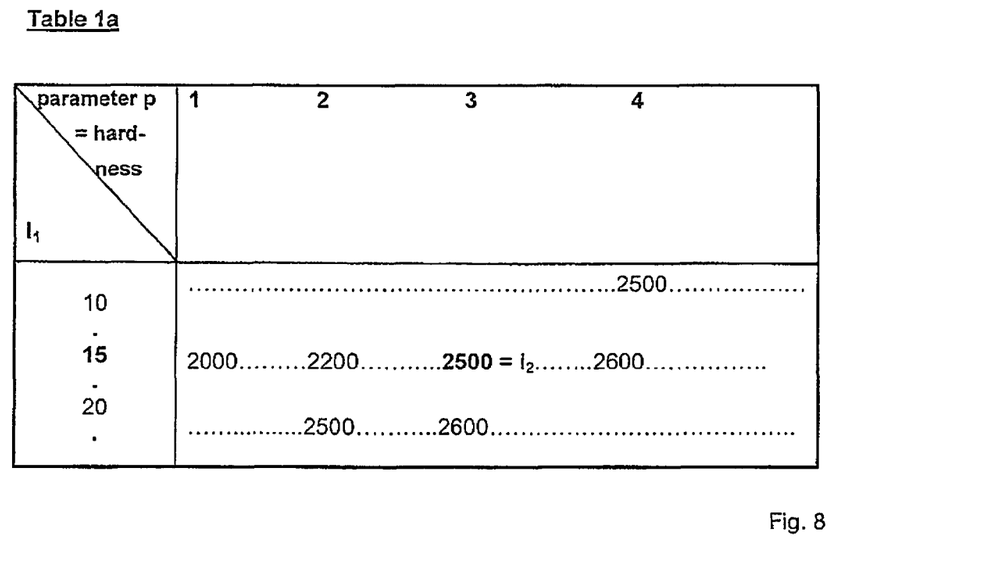

However, the electronic components of the evaluation unit 12 might also falsify the measured values. Therefore, it is recommended the first reference measured value $x_1$ by a measurement of the reference resistor $R_D$ located in the reference circuit 15 in order to determine the second reference measured value $x_2$. This second calibration results in the second calibrated value $I_2$, which is $I_2=x_2/x_1$ An improved first reference Table 1a is shown in FIG. 8.

If for example $I_2$=2500, this value can be found in different rows of Table 1a. However $I_1$=15 is known so that the corresponding hardness value H must be 3.

In the next step the actual height h has to be found which corresponds to the measured value x.

In a second reference table (Table 2, FIG. 9) which contains the hardness H and the $I_1$—values, h=50 mm can be found.

Figure 9:
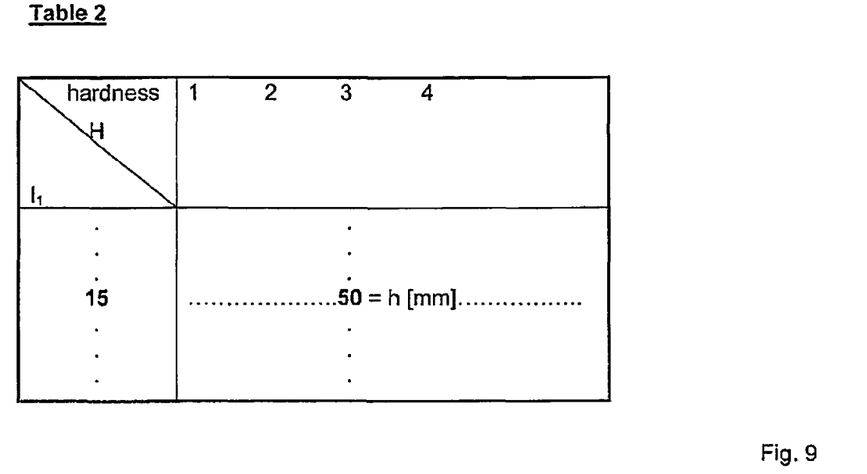
FIG. 9 Table 2.

If the calibration is not conducted and therefore $I_1$ is not determined, Table 2 contains the measured values x instead of $I_1$.

Since the shape and the volume of the vessel doesn't correlate in a linear manner with the filling height, it is necessary to look into a third reference table (Table 3, FIG. 10), where the corresponding volume value $V_0$ can be found. Since the measurement of value x starts from the beginning of the filling procedure, the difference volumes ΔV have to be added. When reaching h=50 mm the total volume is 1, 2 I, which is the sum of the difference values ΔV in table 3 up to the height value h=50 mm.

In order to determine the life-span of the filter cartridge, a fourth table (Table 4, FIG. 11) is used. The hardness value is 3 which corresponds to $V_{max}$=120 I.

All tables have been prepared for a specific filtration device and have been deposited in the memory in the measuring device.

It is preferred to determine the volume values and to compare them with the $V_{max}$ value every time when the value x is measured. The value x is preferably measured five times a second, so that a high precision can be achieved.

LIST OF REFERENCE NUMBERS 1 water filtration device
2 jug
3 grip
4 lid
5 vessel
6 a side wall b bottom wall
7 a inlet b outlet water to be filtered water
10 measuring device
12 evaluation unit
14 indication unit
15 reference circuit
16 capacitor means
17 reference resistor
18 switch
19 switch
20 measuring stick
22 measuring electrode
24 measuring electrode
26 reference electrode
27 shield
28 lower surface
30 electrical connection
32 electrical connection
33 electrical connection 40 water level
40' water level
50 filter cartridge
x measured value
$x_R$ calibration measured value (in the table)
$x_1$ first reference measured value
$x_{1R}$ calibration first reference measured value
$x_2$ second reference measured value
$x_{2R}$ calibration second reference measured value
$V_0$ filling volume
$V_D$ volume of the flow-rate of the electrical conductive liquid
$I_1$ first calibrated value
$I_2$ second calibrated value
h filling height
$V_{max}$ maximum volume of the liquid characterized by a parameter p that is allowed to flow through a filter device

What is claimed is:

1. A method of measurement of a volume $V_D$ of a flow-rate of electrical conductive liquids a conductivity of which is at least codetermined by at least one parameter p,
wherein the liquid flows through a vessel having a predetermined shape, and wherein the respective filling volume $V_0$ in the vessel is determined by at least one measured value x, which is measured by an electrical conductivity measuring device comprising at least two measuring electrodes,
wherein the vessel is filled in succession and then is emptied through its outlet, through which filling heights h are constantly changing, comprising the steps of:
measuring the measured values x in time intervals and determining the respective filling volumes $V_0$ by comparison of the respective measured values x with calibration measured values $x_R$ of at least one reference table comprising at least calibration measured values $x_R$ and filling volumes $V_0$ belonging to them, and
determining the volume $V_D$ of the rate of flow from the filling volumes $V_0$ over a time period,
wherein the at least one reference table is constructed by means of calibration measurements using several liquid samples, which have different p-values and different filling heights h in the vessel.

2. The method according to claim 1, wherein the at least one reference table is deposited in a memory of the measuring device.

3. The method according to claim 1, wherein a first reference measured value $x_1$ is measured at least once during said time period.

4. The method according to claim 3, wherein said first reference measured value $x_1$ is measured only once at the beginning of a filling procedure starting from an empty vessel.

5. The method according to claim 3, wherein said first reference measured value $x_1$ is measured by the same two measuring electrodes which are used for the measurement of the measured value x.

6. The method according to claim 3, wherein said first reference measured value $x_1$ is measured every time when the measured value x is measured.

7. The method according claim 6, wherein the first reference measured value $x_1$ is measured by a reference electrode and one of the measuring electrodes which are used for the measurement of the measured value x.

8. The method according to claim 3, wherein a first reference table is constructed, which contains calibration first reference measured values $x_{1R}$ and values of parameter p belonging to them,
wherein a second reference table is constructed which contains at least the calibration measured values $x_R$, the values of parameter p and the filling heights h belonging to them and
wherein a third reference table is constructed which takes into account the shape of the vessel and which contains the filling heights h and the volumes $V_0$ belonging to them.

9. The method according to claim 8, wherein the value of parameter p is determined at least from the first reference measured value $x_1$ by comparison with the values of first reference table,
wherein the filling height h is determined from at least the measured value x and the values of parameter p by comparison with the values of the second reference table and
wherein the respective filling volume $V_0$ is determined from the filling height h by comparison with the values of the third reference table.

10. The method according to claim 9, wherein the measured value x is referred to the first reference measured value $x_1$ in order to determine a first calibrated value $I_1$.

11. The method according to claim 10, wherein the first calibrated values $I_1$ are deposited in the first and/or in the second reference table.

12. The method according to claim 1, wherein a second reference measured value $x_2$ is measured at least once during said time period.

13. The method according to claim 12, wherein said second reference measured value $x_2$ is measured only once at the beginning of a filling procedure starting from an empty vessel.

14. The method according to claim 12, wherein said second reference measured value $x_2$ is measured every time when the measured value x is measured.

15. The method according to claim 12, wherein said second reference measured value $x_2$ is measured by means of a reference circuit of the electrical conducting measuring device.

16. The method according to claim 11, wherein the first reference measured value $x_1$ is referred to the second reference measured value $x_2$ in order to determine a second calibrated value $I_2$.

17. The method according to claim 16, wherein the calibrated values $I_2$ are deposited in the first reference table.

18. The method according to claim 11, wherein characterized in that the values of the parameter p are determined from the calibrated values $I_1$ and $I_2$ by comparison with the values of the first reference table.

19. The method according to claim 11, wherein the filling height h is determined from the values of parameter p and the first calibrated value $I_1$ by comparison with the values of the second reference table.

20. The method according to claim 1, wherein the filling volume $V_0$ of water is determined.

21. The method according to claim 1, wherein a hardness H of water is determined as parameter p.

22. The method according to claim 12, wherein at least the measured values x, $x_1$ and/or $x_2$ are time values.

23. The method according to claim 22, wherein the charging and/or discharging time of a capacitor means in a circuit of the electrical conductivity measuring device is used as time value.

24. The method according to claim 22, wherein at least the measured values x are measured at least once per second.

25. The method according to claim 24, wherein the measured values x are measured at least five times per second.

26. The method according to claim 1, wherein the changes $\Delta V$ of the filling volume $V_0$ are determined and that the volume $V_D$ of the flow rate is determined from the volume changes $\Delta V$.

27. The method according to claim 26, wherein the volume $V_D$ of the flow rate is determined from the respective volume increase.

28. The method according to claim 26, wherein the volume $V_D$ of the flow rate is compared with a volume $V_{max}$, wherein $V_{max}$ designates the maximum volume of the liquid characterized by at least one parameter p and is allowed to flow through a filter device which is arranged downstream to the vessel and which contains at least one filter medium and
wherein exhaustion of the filter medium is indicated, when $V_{max}$ is reached.

29. The method according to claim 28, wherein the volume $V_{max}$ is determined from the value of parameter p by comparison with the values of a fourth reference table, which contains the respective volumes $V_{max}$ dependent from various values of parameter p.

30. The method according to claim 28, wherein the exhaustion is indicated acoustically and/or optically.

31. The method according to claim 28, wherein the remaining volumes are indicated acoustically and/or optically before the exhaustion of the filter medium is reached.

32. The method according to claim 28, wherein a filter cartridge is used as filtering device.

33. The method according to claim 32, wherein the filter cartridge is located in the outlet of the vessel.

34. A measuring device for the determination of the volume $V_D$ of the flow-rate of electrical conductive liquids through a vessel wherein the filling heights h are changing in a vertical direction and wherein the vessel comprises an inlet, an outlet and a conductivity measuring device which comprises an evaluation unit and at least two measuring electrodes wherein the measuring electrodes are located in the vessel and are connected to the evaluation unit, wherein at least one measured value x is measured by the measuring electrodes characterized in that the evaluation unit is configured for the deposition of at least one reference table comprising at least calibration measured values $x_R$ and filling volumes $V_0$ belonging to them and for comparison of the measured values x of the conductivity measuring device with the calibration measured values $x_R$ of the at least one reference table and for the determination of the volume $V_D$ of the flow rate from the filling volumes $V_0$.

35. The measuring device according to claim 34, wherein both measuring electrodes extend over a total filling height of the vessel and that both measuring electrodes are unshielded.

36. The measuring device according to claim 34, wherein a reference electrode is provided which is located near the measuring electrodes.

37. The measuring device according to claim 36, wherein the reference electrode is shielded with the exception of its lower surface.

38. The measuring device according to claim 36, wherein the electrodes have a constant cross-section along their length.

39. The measuring device according to claim 34, wherein the evaluation unit comprises a capacitor means and that a charging and/or discharging time of the capacitor means is the measured value x.

40. The measuring device according to claim 34, wherein the evaluation unit comprises a reference circuit including a reference resistor.

41. The measuring device according to claim 34, wherein an indication unit is provided.

42. The measuring device according to claim 41, wherein the indication unit is an optical and/or acoustical unit.

43. The measuring device according to claim 38, wherein the electrodes are combined in a measuring stick.

44. The measuring device according to claim 43, wherein the measuring stick is integrated into a wall of the vessel.

45. The measuring device according to claim 35, wherein the vessel is a feeding hopper of a water filtration device.

46. Using the measuring device according to claim 34 as exhaustion measuring device for filter cartridges.

47. The use of the measuring device according to claim 46, wherein the indication unit indicates the time of change of the filter cartridge.

* * * * *

UNITED STATES PATENT AND TRADEMARK OFFICE
CERTIFICATE OF CORRECTION

Page 1 of 1

PATENT NO. : 8,171,802 B2
APPLICATION NO. : 12/736263
DATED : May 8, 2012
INVENTOR(S) : Colin Henderson et al.

It is certified that error appears in the above-identified patent and that said Letters Patent is hereby corrected as shown below:

In Column 10, claim 18, lines 46-47, delete the words "...characterized in that..."

Signed and Sealed this
Seventeenth Day of July, 2012

David J. Kappos
*Director of the United States Patent and Trademark Office*